(12) United States Patent
Son et al.

(10) Patent No.: US 9,744,931 B2
(45) Date of Patent: Aug. 29, 2017

(54) CRASH PAD FOR VEHICLES AND METHOD FOR MANUFACTURING THE SAME

(71) Applicant: HYUNDAI MOBIS CO., LTD., Seoul (KR)

(72) Inventors: Chang Wan Son, Yongin-si (KR); Hea Yeon Lee, Seoul (KR); Yong Chun, Suwon-si (KR); Hyeon Don Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 14/633,017

(22) Filed: Feb. 26, 2015

(65) Prior Publication Data
US 2015/0251620 A1 Sep. 10, 2015

(30) Foreign Application Priority Data

Mar. 5, 2014 (KR) .................. 10-2014-0026259

(51) Int. Cl.
*B60R 21/04* (2006.01)
*B29C 45/16* (2006.01)
(Continued)

(52) U.S. Cl.
CPC .......... *B60R 21/04* (2013.01); *B29C 44/1228* (2013.01); *B29C 44/146* (2013.01);
(Continued)

(58) Field of Classification Search
CPC ....... B60R 21/04; B60R 21/23; B60R 21/215; B32B 27/065
See application file for complete search history.

(56) References Cited

U.S. PATENT DOCUMENTS 4,997,707 A * 3/1991 Otawa .................. B29C 31/04
156/285
6,113,131 A * 9/2000 Uehara ............... B60R 21/2165
280/728.3

(Continued)

FOREIGN PATENT DOCUMENTS

| JP | 2007-332777 A | 12/2007 |
| JP | 2012-20519 A | 2/2012 |
| KR | 10-2013-0132190 A | 12/2013 |

OTHER PUBLICATIONS

Chinese Office Action dated Jul. 29, 2016 of corresponding Chinese Patent Application No. 201410639911.9—8 pages.

*Primary Examiner* — Hai Vo
(74) *Attorney, Agent, or Firm* — Knobbe Martens Olson & Bear LLP

(57) ABSTRACT

The present invention relates to a crash pad for vehicles and a method for preparing the same, and more specifically, a crash pad for vehicles comprising a skin layer forming the outer surface of the crash pad provided with an air-bag module for vehicles; a foaming layer in intimate contact with the lower surface of the skin layer; and a core layer in intimate contact with the lower surface of the foaming layer to form an inner surface, wherein the skin layer has a tensile strength of about 10 to about 100 kgf/cm$^2$ and an elongation at break of about 50 to about 600% according to JIS K6301 method when it has a layer thickness of about 0.2 mm to about 1.0 mm.

13 Claims, 3 Drawing Sheets

(51) Int. Cl.
  *B32B 27/06*     (2006.01)
  *B29C 45/14*     (2006.01)
  *B60R 21/215*    (2011.01)
  *B60R 21/23*     (2006.01)
  *B60R 21/045*    (2006.01)
  *B29C 44/12*     (2006.01)
  *B29C 44/14*     (2006.01)
  B29K 75/00       (2006.01)
  B29K 101/12      (2006.01)
  B29K 105/04      (2006.01)
  B29L 9/00        (2006.01)
  B29L 31/30       (2006.01)

(52) U.S. Cl.
  CPC .... *B29C 45/14467* (2013.01); *B29C 45/1657* (2013.01); *B29C 45/1671* (2013.01); *B32B 27/065* (2013.01); *B60R 21/045* (2013.01); *B60R 21/215* (2013.01); *B60R 21/23* (2013.01); *B29C 2045/14532* (2013.01); *B29K 2075/00* (2013.01); *B29K 2101/12* (2013.01); *B29K 2105/04* (2013.01); *B29L 2009/00* (2013.01); *B29L 2031/3005* (2013.01); *B32B 2266/025* (2013.01); *B32B 2605/003* (2013.01); *B32B 2605/08* (2013.01); *B60R 2021/0407* (2013.01)

(56) References Cited

U.S. PATENT DOCUMENTS

| | | | |
|---|---|---|---|
| 2004/0116646 A1* | 6/2004 | Choi | C08G 18/0895 528/66 |
| 2006/0177620 A1* | 8/2006 | Gray | B29C 65/02 428/57 |
| 2009/0326148 A1* | 12/2009 | Schmalkuche | C08G 18/10 524/789 |
| 2012/0139214 A1 | 6/2012 | Choi et al. | |
| 2012/0223512 A1* | 9/2012 | Barr | B60R 21/2165 280/728.3 |

* cited by examiner (A)

(B)

(C)

(D)

(E)

| | DEPLOYMENT PICTURES | | |
|---|---|---|---|
| (A) |  |  |  |
| (B) |  |  |  |
| (C) |  |  |  |

CRASH PAD FOR VEHICLES AND METHOD FOR MANUFACTURING THE SAME

CROSS-REFERENCES TO RELATED APPLICATIONS

The present application claims priority to Korean application number 10-2014-0026259, filed on Mar. 5, 2014, which is incorporated by reference in its entirety.

The present invention relates to a crash pad for vehicles and a method for preparing the same. More specifically, the present invention relates to a crash pad for vehicles comprising a skin layer, a foaming layer and a core layer without being subjected to a skin scoring process in the foaming specification of the crash pad and a method for preparing the same.

BACKGROUND

Recently, there is an increased need for high performance resin-engineering plastics, plastic alloys and composite materials to be applied to products since a plastic technology of vehicles have been extended to the applications of structures and function parts besides exterior and interior parts of vehicles.

Crash pads are installed in front of driver seats as interior parts of vehicles, and designed to accommodate instrument panels incorporated with speedometers, fuel gauges and water temperature gauges, and the like, air-conditioning systems, radios, clocks, ashtrays and small articles, thereby having an usefulness in the consideration of design and convenience.

In particular, crash pads are considered to be very important parts in the consideration of safety because they are provided with an air-bag and located in front of driver and passenger seats so as to minimize the force transmitted to passengers from external impacts and diminish injuries upon accidental collisions and rollover accidents.

Such crash pads are manufactured in accordance with the trend toward environmental-friendliness, high emotion, weight lightening, and the like, and classified largely as a soft and hard-type, and the soft type crash pads having three layers consisting of a dual skin layer, a forming layer and a core layer and retaining soft cushion in the appearance have been widely used.

Meanwhile, as shown in FIG. 1, the conventional crash pads have been manufactured by (1) shaping a skin layer, (2) subjecting the skin layer to a skin scoring process, (3) mounting the skin layer on a core layer, (4) injection a forming liquid into the skin layer-core layer, and (5) closing a mold to foam the forming liquid.

However, the conventional process comprising the step of (2) subjecting the skin layer to a skin scoring process as described above, may have a variety of problems of an increase in manufacturing costs, an increase in cycle time, an increase in labor costs and working hours for the management of remaining amounts after scoring, and the seamline exposure at the start of the process or after ageing.

Thus, although a technology development to fulfill the needs for crash pads having optimal efficiency along with the increasing needs for vehicles according to recently rapid social development is urgently required, US 2012/0139214, KR 2013-0132190, JP 2007-332777, and the like neither disclose such embodiments nor solutions addressing aforementioned problems.

The inventors have made an effort to improve these problems and now accomplished the present invention by providing a crash pad for vehicles and realized process simplification, cost reduction and weight lightening by not being subjected to a skin scoring process when molding a skin layer in the foaming specification of the crash pad, possessing the performances equivalent to those of the existing crash pads, and solving the problems of the seamline exposure at the start of the process or after ageing, as well as retaining increased cushion by the optional addition of a foam sheet and realizing the extension of foaming specification applied to luxurious vehicles into low cost vehicles and thus the effect of enhanced cost competitiveness. The foregoing discussion is to provide background foundation only and does not constitute an admission of prior art.

SUMMARY

An aspect of the present invention relates to a crash pad for vehicles without being subjected to a skin scoring process in the foaming specification of the crash pad.

The other aspect of the present invention relates to a crash pad for vehicles having an enhanced cushion.

The other aspect of the present invention relates to a method for preparing a crash pad for vehicles realizing process simplification, cost reduction and weight lightening.

The other aspect of the present invention relates to a method for preparing a crash pad for vehicles realizing the extension of the foaming specification applied to luxurious vehicles into low cost vehicles and thus the effect of enhanced cost competitiveness.

These and other aspects of the present invention will be achieved by the embodiments of the present invention as described below.

In one aspect, the present invention relates to a crash pad for vehicles comprising a skin layer forming the outer surface of the crash pad provided with an air-bag module for vehicles; a foaming layer in intimate contact with the lower surface of the skin layer; and a core layer in intimate contact with the lower surface of the foaming layer to form an inner surface, wherein the skin layer has a tensile strength of about 10 to about 100 kgf/cm$^2$ and an elongation at break of about 50 to about 600% according to JIS K6301 method when it has a layer thickness of about 0.2 mm to about 1.0 mm.

In one embodiment, the core layer may include a Passenger Air-Bag (PAB) door, and the opened type of the door may be any one selected from the group consisting of X type, modified X type, - type, H type and U type.

In one embodiment, the skin layer may be formed from a thermoplastic elastomer having a shore A hardness of about 55 to about 99 according to ASTM D2240 method.

In one embodiment, the skin layer may comprise at least one of olefinic resins, urethane resins, acrylic resins, styrenic resins, ester resins, amide resins, vinyl acetate resins and polyvinyl chloride resins, alone or in a combination thereof.

In one embodiment, the skin layer may be formed as a single layer.

In one embodiment, the skin layer may be formed by a Powder Slush Molding (PSM) process, a Male & Female Vacuum Forming process, a spray process and an injection molding, or combinations thereof.

In one embodiment, a foam sheet may be laminated on the top surface of the skin layer.

In one embodiment, the foam sheet may comprise olefin elastomer.

In one embodiment, the foam sheet may further comprise at least one of thermoplastic styrenic elastomer; thermoplastic urethane elastomer; thermoplastic ester elastomer; thermoplastic amide elastomer; and thermoplastic vinyl acetate elastomer.

In one embodiment, the foam sheet may be expandable at an expansion ratio of about 5 to about 50, and have a thickness of about 0.5 mm to about 4.0 mm.

In one embodiment, the skin layer may further comprise a coating layer on the top surface thereof, and the coating layer may comprise at least one of chlorinated polypropylene resins, acrylic resins and urethane resins.

In one embodiment, the coating layer may have a layer thickness of about 0.01 mm to about 0.2 mm.

In one embodiment, the foaming layer may comprise polyurethane resins, and have a layer thickness of about 3 mm to about 12 mm.

In another aspect, the present invention relates to a method for preparing a crash pad for vehicles comprising a skin layer, a foaming layer and a core layer, comprising (a) shaping a core layer in a male die for the crash pad and a skin layer in a female die for the crash pad; (b) mounting the female die on the crash pad male die to form the core layer—skin layer; (c) injecting a foaming liquid between the core layer and the skin layer; (d) closing and heating a foaming mold of the male die and the female die injected with the foaming liquid to form a foaming layer; and (e) de-molding the crash pad with the core layer—foaming layer—skin layer integrated, wherein the skin layer is not subjected to a skin scoring process.

In one embodiment, a crash pad for vehicles may be manufactured by the aforementioned method.

The crash pad for vehicles and the method for preparing the same according the present invention may realize process simplification, cost reduction and weight lightening by not being subjected to a skin scoring process when molding a skin layer in the foaming specification of the crash pad, possess the performances equivalent to those of the existing crash pads, and solve the problems of the seamline exposure at the start of the process or after ageing, as well as retain increased cushion by the optional addition of a foam sheet and realize the extension of the foaming specification applied to luxurious vehicles into low cost vehicles and thus the effect of enhanced cost competitiveness.

DESCRIPTION OF SPECIFIC EMBODIMENTS

Figure 1:
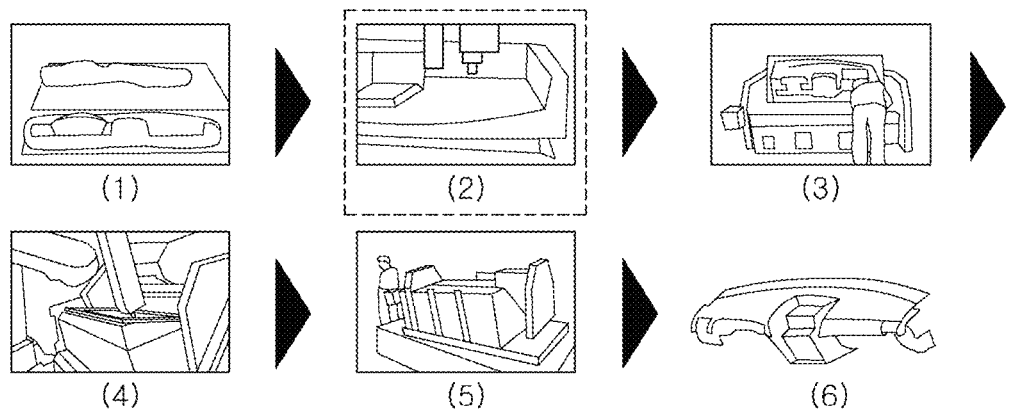
FIG. 1 is a flow chart illustrating the manufacture steps of a crash pad for vehicles by the conventional process.

The embodiments of the present invention will now be described in more detail with reference to the accompanying drawings. However, the technology disclosed in the present invention is not limited to the embodiments described herein and may be embodied in other forms. It should be noted that the embodiments described herein are provided for the disclosures to be understood thoroughly and completely and for those skilled in the art to fully understand the spirits of the present invention. It should be noted that the drawings are not to precise scale and may be exaggerated in thickness of lines or sizes of components for descriptive convenience and clarity only.

Furthermore, although some parts of elements are described for the convenience of the description, those skilled in the art readily may understand the other parts of elements. Generally, the drawings are described from the viewpoint of observers, and if one element is described as positioned above or below the other element, it encompasses both that the one element is positioned directly above or below the other element and that additional elements may be interposed between these elements. In addition, the spirits of the present invention may be embodied in various other forms by those skilled in the art without departing the technical spirit of the present invention. Also, the like reference numbers will designate substantially the like elements in a number of drawings.

Moreover, it should be understood that singular terms encompass plural terms, unless otherwise noted expressively in the context, and that the terms such as "comprise" or "have," and the like are intended to mean the presence of features, numbers, steps, actions, elements, components or combinations thereof as described and are not intended to exclude the possibility of the addition or presence of one or more of other features, numbers, steps, actions, elements, components or combinations thereof.

Furthermore, when performing a process or a manufacturing process, as long as the particular sequences are not described expressively in the context, the steps constituting the processes may be carried out differently from the described sequences. In other words, each step may be carried out identically with the described sequences or substantially concurrently, or in reverse sequences.

Now, the present invention will be described in more detail.

Crash Pad for Vehicles

In one aspect, a crash pad for vehicles according to the present invention may comprise a skin layer forming the outer surface of the crash pad provided with an air-bag module for vehicles; a foaming layer in intimate contact with the lower surface of the skin layer; and a core layer in intimate contact with the lower surface of the foaming layer to form an inner surface, and the skin layer may have a tensile strength of about 10 to about 100 kgf/cm$^2$ and an elongation at break of about 50 to about 600% according to JIS K6301 method when it has a layer thickness of about 0.2 mm to about 1.0 mm.

Figure 2:
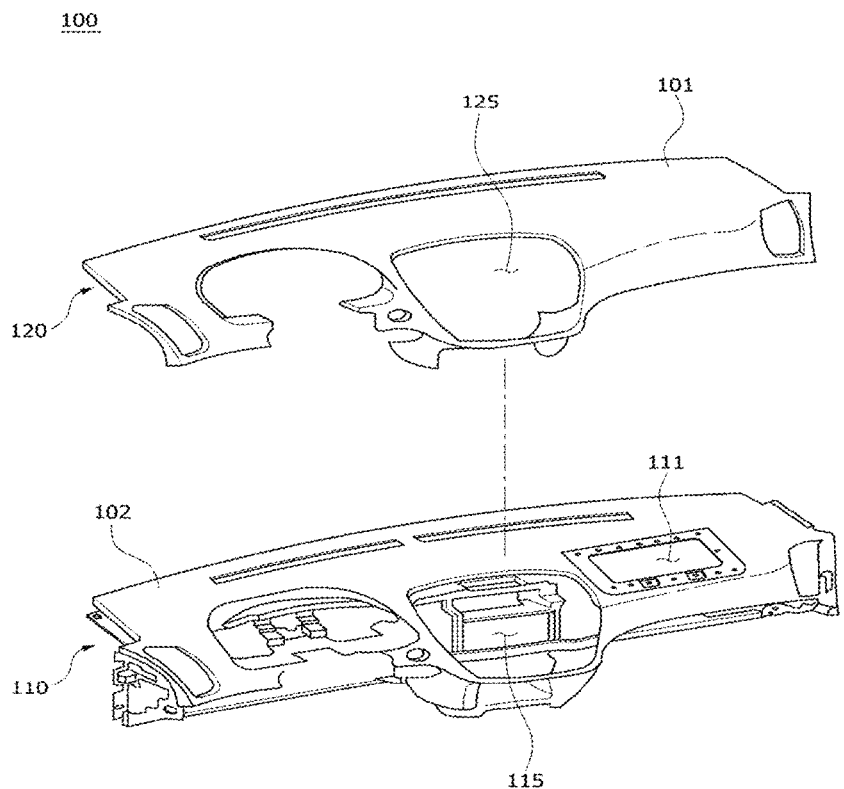
FIG. 2 is a development drawing illustrating the front portion of the configurations of a crash pad for vehicles according to the exemplary embodiment of the present invention.
Figure 3:
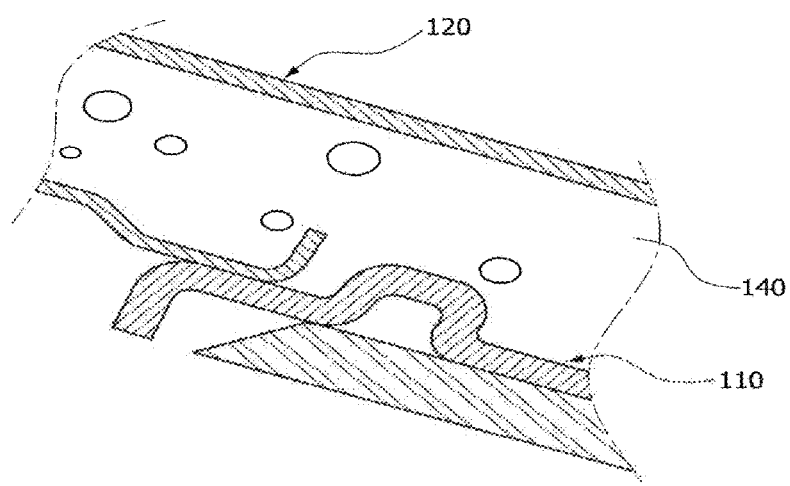
FIG. 3 is a sectional drawing partially illustrating the configurations of a crash pad for vehicles according to the exemplary embodiment of the present invention.
Figure 4:
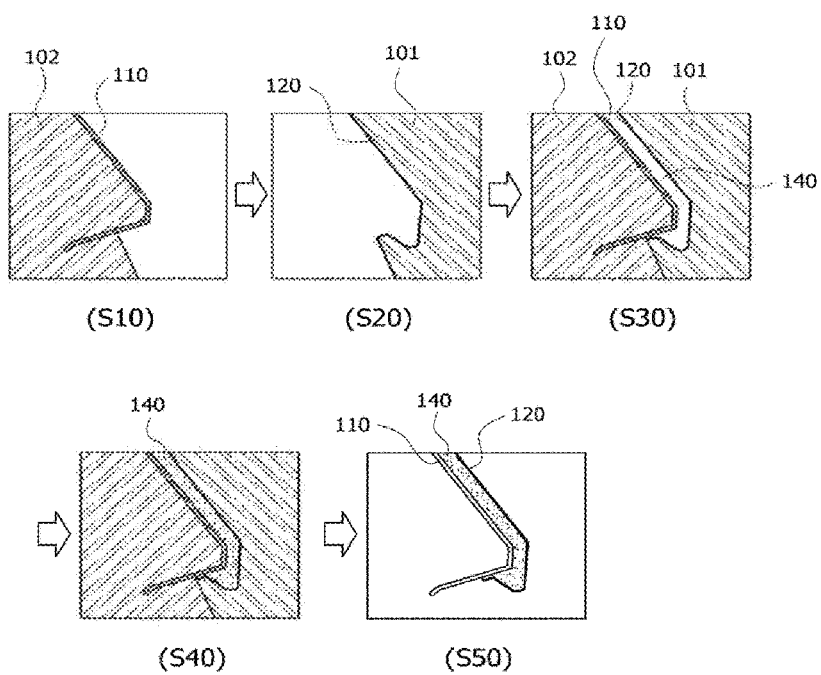
FIG. 4 is a flow chart illustrating the manufacture steps of a crash pad for vehicles according to the exemplary embodiment of the present invention.

FIGS. 2 to 4 are development drawings illustrating the front portion of the configurations of a crash pad for vehicles, a partial sectional drawing partially illustrating the configurations of a crash pad for vehicles and a flow chart illustrating the manufacturing steps of a crash pad for vehicles, respectively. Referring to FIGS. 2 to 4, a crash pad for vehicles 100 is provided with a core layer 110, a skin layer 120 and a foaming layer 140.

Core Layer

A core layer 110 forms the front portion of driver and passenger seats and has stiffness to prevent passengers inside vehicle cabins from external impacts upon collisions and rollover accidents, and may also have an insertion hole 111 to be installed with an air-bag and a first mounting part 115 to be installed with an apparatus such as an air-conditioner and a control button for its control.

The core layer 110 may use PP composite or PC/ABS class comprising talc, glass fiber, carbon fiber, rubber (EOR, EBR, EPDM, SEBS), and the like, alone or in a combination thereof, and may comprise an incorporated or separated plastic PAB door in order to impart the function for deploying a passenger air-bag (PAB).

Figure 5:
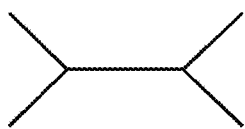
FIG. 5 is a schematic drawing illustrating the opened type of PAB door of a crash pad for vehicles according to the exemplary embodiment of the present invention.
Figure 5:
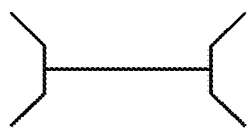
Figure 5:
Figure 5:
Figure 5:
Figure 6:
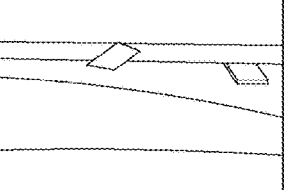
FIG. 6 is a photograph illustrating the results of the deployment performance of a crash pad for vehicles, a molding article, according to the exemplary embodiment of the present invention.
Figure 6:
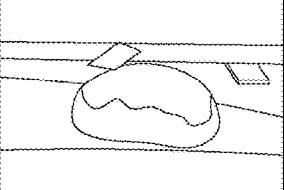
Figure 6:
Figure 6:
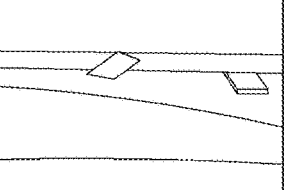
Figure 6:
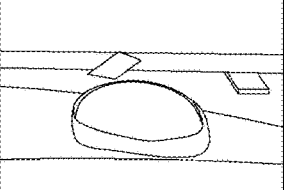
Figure 6:
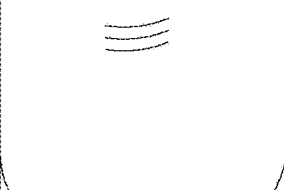
Figure 6:
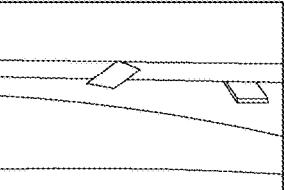
Figure 6:
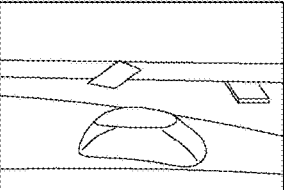
Figure 6:
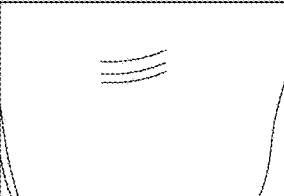

In one embodiment, the core layer 110 may have any one of X type, modified X type, - type, H type and U type as the opened type of the passenger air-bag (PAB) door as illustrated in FIG. 5 to secure the smooth deployment performance of a skin layer 120 without being subjected to a skin scoring process.

Skin Layer

A skin layer 120 may be disposed outside of the core layer 110 thereby facing the core layer 110, and forms softly the interior surface of vehicles using materials different from those of core layer 110 having stiffness. A second mounting part 125 corresponding to the first mounting part 115 may be formed in the skin layer 120, and air-conditioners and radios, control buttons, and the like may be installed in the first and second mounting parts 115,125.

Unlike crash pads for vehicles 100 according to the present invention, the skin layer 120 may be formed without being subjected to a "skin scoring" process such as laser scoring, hot knife, cold knife, ultrasonic knife, milling, and the like. Through this, it is possible to realize the process simplification, cost reduction such as reduction in material costs, and weight lightening of crash pads due to the thin thickness of a skin layer, possess the performances equivalent to those of the existing crash pads, and solve the problems of the seamline exposure at the start of the process or after ageing, as well as retain increased cushion by the optional addition of a foam sheet between a skin layer and a foaming layer, and realize the extension of the foaming specification applied to luxurious vehicles into low cost vehicles and thus the effect of enhanced cost competitiveness.

The skin layer 120 may have a tensile strength of about 10 to about 100 kgf/cm$^2$ or an elongation at break of about 50 to about 600% according to JIS K6301 method (a test rate of about 200 mm/min) when having a layer thickness of about 0.2 mm to about 1.0 mm. Preferably, it may have a tensile strength of about 15 to about 90 kgf/cm$^2$ or an elongation at break of about 150 to about 400% when having a layer thickness of about 0.4 mm to about 0.8 mm. When the layer thickness is less than about 0.2 mm, the skin layer 120 may burst upon skin or foaming molding, and when the layer thickness is more than about 1.0 mm, there is a drawback of the difficulties in realizing the physical properties for the deployment performance of the conventional air-bag, and maintaining emotional quality, sharpness of the appearance after vacuum molding, harmony with related parts and material costs. When the tensile strength is less than about 10 kgf/cm$^2$, it is difficult to maintain uniform physical properties, and when the tensile strength is more than about 100 kgf/cm$^2$, there is a drawback of the difficulties in realizing the physical properties for the deployment performance of the conventional air-bag. In addition, when the elongation at break is less than about 50%, it is difficult to maintain uniform physical properties, and when the elongation at break is more than about 600%, there is a drawback of the difficulties in realizing the physical properties for the deployment performance of the conventional air-bag. The present invention may provide the crash pads having excellent effect such as increased cushion, good moldability, securement of the smooth deployment performance upon the deployment of the air-bag, and weight lightening of about 10% or more due to the thin thickness of a skin layer, over the conventional invention, even if not being subjected to skin scoring process, by maintaining the values of the tensile strength and the elongation at break within the ranges of the layer thickness as described above.

In one embodiment, the skin layer 120 may be formed from thermoplastic elastomers having a shore A hardness of about 55 to about 99, and preferably about 60 to about 80 according to ASTM D2240 method. Alternatively, it may be formed from thermoplastic elastomers having a shore A hardness of about 20 to about 55, and preferably about 23 to about 33 according to ASTM D2240 method. Within this range, it is possible to realize the conventional physical properties of the skin layer 120 even if not being subjected to a skin scoring process, and the flexibly modifiable resisting force upon the external impacts such as collisions, etc. of vehicles.

In one embodiment, the skin layer 120 may be formed from thermoplastic elastomers. For example, thermoplastic styrene elastomer, thermoplastic polyvinyl chloride (PVC) elastomer, thermoplastic olefin elastomer, thermoplastic polyester elastomer, thermoplastic polyamide elastomer, thermoplastic urethane elastomer, and the like may be used as thermoplastic elastomers.

In one embodiment, the skin layer 120 may comprise thermoplastic olefin elastomer, thermoplastic urethane elastomer, thermoplastic acryl elastomer, thermoplastic styrene elastomer, thermoplastic ester elastomer, thermoplastic amide elastomer, thermoplastic vinyl acetate elastomer and thermoplastic polyvinyl chloride elastomer, and the like, either alone or in a combination thereof.

In one embodiment, the skin layer 120 may be formed as a single layer. The single layer used herein means the one layer formed from a homogenous material.

In one embodiment, the skin layer 120 may be formed as a single layer by a Powder Slush Molding (PSM) process, a Male & Female Vacuum Forming process, a spray process and an injection molding, or a combination thereof without being subjected to a skin scoring process.

In one embodiment, the skin layer 120 may be laminated on the top surface of the skin layer.

The top surface refers to an upper surface or a lower surface of the skin layer 120, and the foam sheet may complement moldability by laminating with the skin layer when molding crash pads of the present invention, and increase the motivation of vehicle users on tactility (emotion) such as cushion. Furthermore, the skin layer 120 is not believed to comprise the foam sheet together since an additional foam sheet may be formed in contact with the upper surface or the lower surface of the skin layer 120.

In one embodiment, the foam sheet may comprise an olefin elastomer alone or a combination of an olefin elastomer and a different thermoplastic elastomer.

The olefin elastomer may allow molding and processing to be easily carried out using the same processing equipment with the normal thermoplastic olefinic resin because it has elasticity of rubbers and properties of plastics simultaneously and thermoplastic properties by crosslinking mainly the olefinic resin for example, PE or PP (as a hard segment) and the olefin rubber (for example, EPDM) to prepare elastomers. The olefin elastomer according to present invention may contribute to the complement of moldability in vacuum molding, improvement of flexibility and increased cushion when the foam sheet comprises the olefin elastomer.

In one embodiment, the foam sheet may comprise olefin elastomers and different thermoplastic elastomers. The different elastomers may comprise thermoplastic styrene elastomer; thermoplastic urethane elastomer; thermoplastic ester elastomer; thermoplastic amide elastomer; thermoplastic vinyl acetate elastomer; and the like. It may be used alone or in a combination thereof. The different elastomers may be present in an amount of about 0.1 to about 50 wt % in the total foam sheet.

In one embodiment, the foam sheet may be expandable at an expansion ratio of about 5 to about 50, and have a thickness of about 0.5 mm to about 4.0 mm, and preferably about 0.8 mm to about 1.5 mm. Within this range of the thickness, the foam sheet when laminated with textiles may complement moldability of textiles having the thin thickness, and the skin layer 120 formed from it have an advantage of improving surface emotion.

In one embodiment, the skin layer 120 may further comprise a coating layer on the top surface thereof.

The coating layer may comprise at least one of chlorinated polypropylene resins, acrylic resins and urethane resins, and the like. The top surface refers to an upper surface or a lower surface of the skin layer 120, and the skin layer 120 is not believed to comprise the coating layer together since the coating layer is a layer formed by mixing the resin and the like alone or in admixture and coating it in contact with the upper surface or the lower surface of the skin layer 120.

In one embodiment, the coating layer may have a thickness of about 0.01 mm to about 0.2 mm, and preferably about 0.03 mm to about 0.1 mm. Within this range, it is possible to improve scratch resistance, durability, chemical resistance, wear resistance, and the like of the crash pads for vehicles 100 of the present invention. The interior parts of vehicles may be coated by for example spray coating, gravure coating, and the like, and the crash pad 100 may be coated preferably by spray coating. The spray coating may have a relatively high spread amount and form a coating layer in a manner of coating a treating agent on an embossed sheet.

Foaming Layer

A foaming layer 140 may be formed by injecting a foaming liquid (foam) between the core layer 110 and the skin layer 120 so as to diminish damage such as head injuries and the like by absorbing impacts and minimize the force transmitted to passengers.

In one embodiment, the foaming layer 140 may comprise polyurethane resins, and have a layer thickness of about 3 mm to about 12 mm, and preferably about 5 mm to about 10 mm. Within this range of the layer thickness, it is possible to prevent non-homogeneity and bursting of layers mounted in foaming molding, and to maintain emotional quality, sharpness of the appearance after vacuum molding, and material costs.

Method of Manufacturing Crash Pad for Vehicles

A method of manufacturing a crash pad for vehicles according to another aspect of the present invention is a method of manufacturing a crash pad for vehicles consisting of a skin layer, a foaming layer and a core layer, the method comprising (a) shaping a core layer in a male die for the crash pad and a skin layer in a female die for the crash pad; (b) mounting the female die on the crash pad male die to form the core layer—skin layer; (c) injecting a foaming liquid between the core layer and the skin layer; (d) closing and heating a foaming mold of the male die and the female die injected with the foaming liquid to form a foaming layer; and (e) de-molding the crash pad with the core layer—foaming layer—skin layer integrated, wherein the skin layer is not subjected to a skin scoring process.

Referring to FIG. 4, the method of manufacturing a crash pad according to one embodiment of the present invention may be subjected to the stages as follows:

First, in stage S10 a core layer 110 may be shaped and deposited in a male die 102, and in stage S20 a skin layer 120 may be shaped and deposited in a female die 101. Then, in stage S30 the male die 101 may be mounted on the male die 102 and the dies may be closed to form the core layer-skin layer with the core layer and the skin layer bonded each other, and in stage S40 a foaming liquid may be injected between the core layer and the skin layer. Then, in stage S50 a foaming mold of the male die 102 and the female die 101 injected with the foaming liquid may be closed and heated to allow for the swollen foam to form a foaming layer 140. Then, after the foaming layer 140 is formed between the core layer—skin layer with the core layer 110 and the skin layer 120 bonded, a crash pad 100 with the core layer—foaming layer—skin layer integrated may be de-molded. In this case, the skin layer 120 may be formed without being subject to a 'skin scoring' process such as laser scoring, hot knife, cold knife, ultrasonic knife, milling, and the like unlike the conventional invention.

In one embodiment, a crash pad for vehicles 100 may be manufactured by the method as described above. The crash pad for vehicles 100 manufactured according to the present invention may realize process simplification, cost reduction and weight lightening by not being subjected to a skin scoring process when molding a skin layer in the foaming specification of the crash pad consisting of the skin layer, the foaming layer and the core layer, and possess the performances equivalent to those of the existing crash pads, as well as retain increased cushion by the optional addition of a foam sheet and realize the extension of the foaming specification applied to luxurious vehicles into low cost vehicles and thus the effect of enhanced cost competitiveness.

Although the Example and Comparative Examples of the present invention will be described in detail, the present invention is not limited to those.

EXAMPLES

Example 1

A core layer was shaped in a male die for the crash pad, and a skin layer was shaped in a female die for the crash pad, respectively, and thereafter, a core layer—skin layer was formed by mounting the female die on the male die. Then, a foaming liquid was injected between the core layer and the skin layer, a foaming mold of the male die and the female die injected with the foaming liquid was closed to allow for the swollen foam to form a foaming layer by the reaction. Then, a crash pad with the core layer—foaming layer—skin layer integrated was de-molded to complete finally the crash pad for vehicles according to embodiments of the present invention.

Experimental Example

The basic properties, moldability, deployment performance, and the like of the crash pad for vehicles, a molding article, manufactured in the Example 1 were determined, and the results thereof are shown in Tables 1 and 2.

The method of measuring physical properties is described as follows.

Method of Measuring Physical Properties

Basic properties (1) Tensile strength (kgf/cm$^2$): UTM (a universal testing machine) from Instron Corporation was used to measure a tensile strength according to JIS K6301 method.

(2) Elongation at break (%): UTM (a universal testing machine) from Instron Corporation was used to measure an elongation at break according to JIS K6301 method.

(3) Shore A hardness: A shore hardness tester from ASKER Inc. was used to measure a shore A hardness according to ASTM D2240 method.

Examples 1 to 4, if a skin layer had a thickness of 0.2 mm to 1.0 mm, a tensile strength of 10 to 100 kgf/cm$^2$ and an elongation at break of 50 to 600%, when the basic properties are measured, by forming the skin layer without being subjected to a skin scoring process.

More specifically, in Comparative Examples 1 to 4, it can be shown that a crash pad failed in the test of deployment performance of PAB even if a skin layer had a layer thickness more than 1.0 mm, a tensile strength of less than 100 kgf/cm$^2$ and an elongation at break of less than 600%,

TABLE 1

| | | Examples | | | | Comparative Examples | | | |
|---|---|---|---|---|---|---|---|---|---|
| | | 1 | 2 | 3 | 4 | 1 | 2 | 3 | 4 |
| Skin layer | Manufacturing process | Vacuum Male | Vacuum Female | Injection molding | PSM | Vacuum Male | Vacuum Female | Injection molding | PSM |
| | Thickness (mm) | 0.4 | 0.6 | 0.8 | 0.9 | 1.1 | 1.1 | 1.1 | 1.2 |
| Foam sheet | Yes or No | Yes | Yes | No | No | No | No | No | No |
| | Thickness (mm) | 1.5 | 1.0 | — | — | — | — | — | — |
| Skin scoring process | | No | No | No | No | No | No | No | No |
| Basic properties | Tensile strength (kgf/cm$^2$) | 40 | 89 | 29 | 64 | 40 | 80 | 55 | 94 |
| | Elongation at break (%) | 350 | 260 | 450 | 330 | 350 | 450 | 450 | 550 |
| | Shore A hardness | 92 | 89 | 80 | 78 | 92 | 89 | 80 | 78 |
| PAB deployment test | Ambient temp. (21° C.) | Pass | Pass | Pass | Pass | Pass | Fail | Pass | Fail |
| | Low temp. (−35° C.) | Pass | Pass | Pass | Pass | Pass | Pass | Pass | Pass |
| | High temp. (85° C.) | Pass | Pass | Pass | Pass | Fail | Fail | Fail | Fail |

TABLE 2

| | | Comparative Examples | | | | | | | |
|---|---|---|---|---|---|---|---|---|---|
| | | 5 | 6 | 7 | 8 | 9 | 10 | 11 | 12 |
| Foam sheet | Manufacturing process | Vacuum Male | Vacuum Female | Injection molding | PSM | Vacuum Male | Vacuum Female | Injection molding | PSM |
| | Thickness (mm) | 0.4 | 0.6 | 0.8 | 0.9 | 1.1 | 1.3 | 1.1 | 1.2 |
| Foam sheet | Yes or No | No | No | No | No | No | No | No | No |
| | Thickness (mm) | — | — | — | — | — | — | — | — |
| Skin scoring process | | No | No | No | No | Yes | Yes | Yes | Yes |
| Basic properties | Tensile strength (kgf/cm$^2$) | 115 | 125 | 155 | 140 | 115 | 125 | 155 | 140 |
| | Elongation at break (%) | 700 | 750 | 700 | 800 | 650 | 650 | 700 | 800 |
| | Shore A hardness | 92 | 89 | 80 | 78 | 92 | 89 | 80 | 78 |
| PAB deployment test | Ambient temp. (21° C.) | Pass | Pass | Fail | Fail | Pass | Pass | Pass | Pass |
| | Low temp. (−35° C.) | Pass | Pass | Fail | Fail | Pass | Pass | Pass | Pass |
| | High temp. (85° C.) | Fail | Fail | Fail | Fail | Pass | Pass | Pass | Pass |

Results of the Measurement of Physical Properties

Referring to Tables 1 and 2, it can be seen that a crash pad of the present invention had an optimal efficacy in realizing the physical properties of the skin layer while eliminating the need of being subjected to a skin scoring process in and it is believed that the layer thickness of the skin layer have a great effect on the formation of the crash pad and the deployment of PAB.

In addition, in Comparative Examples 5 to 8, it can be shown that a crash pad also failed in the test of deployment performance of PAB even if the skin layer had a layer thickness less than 1.0 mm, a tensile strength of more than 100 kgf/cm$^2$ and an elongation at break of more than 600%, and it is believed that the range of the tensile strength and the elongation at break under certain conditions have an effect on the formation of the crash pad and the deployment of PAB.

Meanwhile, although the crash pad manufactured according to the conventional invention comprising a skin scoring process showed a favorable propensity in PASS state in the test of deployment performance of PAB, it required relatively thicker layer thickness and high value of physical properties such as a layer thickness of more than 1.0 mm, a tensile strength of more than 100 kgf/cm$^2$ and an elongation at break of more than 600% when forming the skin layer in Comparative Examples 9 to 12, indicating that the conditions of forming the skin layer, not subjected to a skin scoring process according to embodiments of the present invention, are more superior as in Examples 1 to 4.

As described above, the crash pad for vehicles and the method of manufacturing the same according to the present invention may realize process simplification, cost reduction and weight lightening by not being subjected to a skin scoring process when molding a skin layer in the foaming specification of the crash pad consisting of the skin layer, the foaming layer and the core layer, and possess the performances equivalent to those of the existing crash pads, as well as retain increased cushion by the optional addition of a foam sheet and realize the extension of the foaming specification applied to luxurious vehicles into low cost vehicles and thus the effect of enhanced cost competitiveness (see Tables above).

The invention has been explained in relation to the embodiments shown in the drawings. Accordingly, it is to be understood that the embodiments of the invention described herein are merely illustrative of the application of the principles of the invention. Further, those skilled in the art will appreciate that various modifications, additions and substitutions are possible, without departing from the scope and spirit of the invention as disclosed in the accompanying claims.

Therefore, the scope of the invention should not be limited to the embodiments described herein, and be determined in the consideration of the accompanying claims as well as equivalents to the claims.

DESCRIPTION OF REFERENCE NUMERALS

| | |
|---|---|
| 100: Crash pad | 101: Male die |
| 102: Female die | 110: Core layer |
| 111: Air-bag injection hole | 115: First mounting part |
| 120: Skin layer | 125: Second mounting part |
| 140: Foaming layer | |

What is claimed is:

1. A crash pad for a vehicle, the crash pad comprising:
a skin layer providing an outer surface of the crash pad;
a foam layer formed under the skin layer and contacting the skin layer; and
a core layer formed under the foam layer such that the foam layer is interposed between the skin layer and the core layer, the core layer comprising a top surface facing the skin layer,
wherein the core layer comprises an opening formed through the top surface for deploying an airbag therethrough toward the skin layer,
wherein the skin layer in the form of a single, continuous layer is made of a homogeneous material which covers the top surface and the opening,
wherein the skin layer does not comprise an opening corresponding to the opening of the core layer, wherein the skin layer has no score formed therein,
wherein the skin layer has a thickness of about 0.2 mm to about 1.0 mm, a tensile strength of about 10 to about 100 kgf/cm2 and an elongation at break of about 50 to about 600% according to JIS K6301 method.

2. The crash pad according to claim 1, wherein the core layer includes an opening for Passenger Air-Bag (PAB) door, the opening is in a shape selected from the group consisting of an X shape, a modified X shape, a bar shape, an H shape, and a U shape.

3. The crash pad according to claim 1, wherein the skin layer is formed from a thermoplastic elastomer having a shore A hardness of about 55 to about 99 according to ASTM D2240 method.

4. The crash pad according to claim 1, wherein the skin layer comprises at least one selected from the group consisting of olefinic resins, urethane resins, acrylic resins, styrenic resins, ester resins, amide resins, vinyl acetate resins and polyvinyl chloride resins.

5. The crash pad according to claim 1, wherein the skin layer is selected from the group consisting of a Powder Slush Molded (PSM) layer, a Male & Female Vacuum Formed layer, a spray-processed layer, and an injection molded layer.

6. The crash pad according to claim 1, further comprising a foam sheet laminated over the skin layer.

7. The crash pad according to claim 6, wherein the foam sheet comprises an olefin elastomer.

8. The crash pad according to claim 7, wherein the foam sheet further comprises at least one selected from the group consisting of thermoplastic styrene elastomer; thermoplastic urethane elastomer; thermoplastic ester elastomer; thermoplastic amide elastomer; and thermoplastic vinyl acetate elastomer.

9. The crash pad according to claim 6, wherein the foam sheet is expandable at an expansion ratio of about 5 to about 50, and has a thickness of about 0.5 mm to about 4.0 mm.

10. The crash pad according to claim 1, further comprising a coating layer formed on the skin layer, wherein the coating layer comprises at least one of chlorinated polypropylene resins, acrylic resins and urethane resins.

11. The crash pad according to claim 10, wherein the coating layer has a thickness of about 0.01 mm to about 0.2 mm.

12. The crash pad according to claim 1, wherein the foam layer comprises a polyurethane resin, and has a thickness of about 3 mm to about 12 mm.

13. A method for preparing the crash pad of claim 1, comprising:
providing the core layer in a male die;
providing the skin layer in a female die;
arranging the female die and the male die such that the top surface of the core layer faces the skin layer;
injecting a foaming liquid between the core layer and the skin layer;
closing and heating a foaming mold of the male die and the female die to form a foaming layer; and
de-molding the crash pad comprising the core layer, the foaming layer and the skin layer which are integrated,
wherein the skin layer is not subjected to a skin scoring process.

* * * * *